(12) United States Patent
Nordmann et al.

(10) Patent No.: US 11,178,958 B2
(45) Date of Patent: Nov. 23, 2021

(54) HARNESS

(71) Applicant: Andreas Stihl AG & Co. KG, Waiblingen (DE)

(72) Inventors: Alexander Nordmann, Stuttgart (DE); Markus Herrmann, Fellbach (DE); Daniel Wagner, Winterbach (DE); Markus Zeller, Schwaebisch-Gmuend/Herlikhofen (DE); Joachim Kolb, Ludwigsburg (DE); Markus Pfeifer, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 16 days.

(21) Appl. No.: 16/571,867

(22) Filed: Sep. 16, 2019

(65) Prior Publication Data

US 2020/0085173 A1 Mar. 19, 2020

(30) Foreign Application Priority Data

Sep. 17, 2018 (EP) .................................... 18194891

(51) Int. Cl.
*A45F 3/14* (2006.01)
*A45F 3/04* (2006.01)
(Continued)

(52) U.S. Cl.
CPC .................. *A45F 3/14* (2013.01); *A45F 3/04* (2013.01); *H01M 50/20* (2021.01);
(Continued)

(58) Field of Classification Search
CPC ........ A45F 3/14; A45F 2003/146; A45F 3/08; A45F 3/04; A45F 3/10; A45F 2003/148;
(Continued)

(56) References Cited

U.S. PATENT DOCUMENTS 4,572,414 A 2/1986 Blatt
4,911,346 A 3/1990 Shallman
(Continued)

FOREIGN PATENT DOCUMENTS

DE 20 2013 011 447 U1 3/2014
DE 20 2012 013 284 U1 1/2016
(Continued)

OTHER PUBLICATIONS

German-language European Search Report issued in counterpart European Application No. 18194891.0 dated Dec. 21, 2018 with partial English translation (14 pages).
(Continued)

*Primary Examiner* — Brian D Nash
(74) *Attorney, Agent, or Firm* — Crowell & Moring LLP

(57) ABSTRACT

A harness for a battery pack that can be worn on the back and that supplies electrical energy to hand-held electrical tools includes a support base and a support strap unit for the support base, as well as a holding device for releasably holding a battery pack in a support position on the support base. The holding device has a docking mechanism on the support base for pivotably docking the battery pack in a docking position, and a securing mechanism on the support base for securing the battery pack in the support position pivoted in towards the support base with respect to the docking position. The docking mechanism is arranged on a lower region of the support base.

15 Claims, 8 Drawing Sheets

(51) Int. Cl.
*H01M 50/20* (2021.01)
*H01M 50/256* (2021.01)

(52) U.S. Cl.
CPC ..... *H01M 50/256* (2021.01); *A45F 2003/045* (2013.01); *A45F 2003/146* (2013.01)

(58) Field of Classification Search
CPC ............... A45F 2003/045; A45F 3/047; A45F 2003/003; A62B 9/04; Y10S 224/907
See application file for complete search history.

(56) References Cited

U.S. PATENT DOCUMENTS

| | | | |
|---|---|---|---|
| 4,934,573 A | 6/1990 | Jaeger | |
| 5,480,115 A | 1/1996 | Haltof | |
| 5,628,443 A | 5/1997 | Deutsch | |
| 5,732,867 A | 3/1998 | Perkins et al. | |
| 5,806,741 A * | 9/1998 | Kirk | A45F 5/00 224/634 |
| 5,954,250 A | 9/1999 | Hall et al. | |
| 5,991,925 A | 11/1999 | Wu | |
| 6,079,602 A * | 6/2000 | Howell | A45F 3/047 224/262 |
| 6,095,470 A | 8/2000 | Kalis | |
| 6,106,971 A * | 8/2000 | Spotnitz | H01M 2/10 429/98 |
| 6,168,881 B1 * | 1/2001 | Fischer | B25F 5/02 429/97 |
| 6,290,111 B1 * | 9/2001 | Hedenberg | A45F 3/10 224/262 |
| 6,848,120 B2 * | 2/2005 | Kling | A62B 9/04 2/2.15 |
| 6,857,820 B2 | 2/2005 | Jacoway et al. | |
| 7,703,645 B2 | 4/2010 | Moskun | |
| 7,778,026 B2 | 8/2010 | Mitchell | |
| 7,793,809 B2 | 9/2010 | Howell | |
| 7,911,779 B1 | 3/2011 | Tarnoff | |
| 8,006,877 B2 | 8/2011 | Lowry et al. | |
| 8,584,917 B2 | 11/2013 | Hexels | |
| 8,714,424 B2 * | 5/2014 | Oddou | A45F 3/04 224/262 |
| 9,220,333 B2 | 12/2015 | Losos et al. | |
| 9,232,848 B2 | 1/2016 | Krikorian | |
| 9,332,821 B2 * | 5/2016 | Janssen | A45F 3/04 |
| 9,350,408 B2 | 5/2016 | Cipolla et al. | |
| 9,949,557 B2 | 4/2018 | Grimaldi et al. | |
| 10,230,077 B2 | 3/2019 | Rief et al. | |
| 10,288,384 B2 * | 5/2019 | Kinnings | A45F 3/12 |
| 10,299,570 B2 | 5/2019 | Kim et al. | |
| 10,485,690 B2 * | 11/2019 | Ernst, Jr. | A61F 5/028 |
| 2003/0000974 A1 | 1/2003 | McUmber | |
| 2011/0108595 A1 * | 5/2011 | Hoag | A45F 3/10 224/633 |
| 2012/0286120 A1 | 11/2012 | Ziaylek et al. | |
| 2014/0345604 A1 * | 11/2014 | Wang | A62B 7/02 128/202.13 |
| 2015/0189974 A1 * | 7/2015 | Bercaw | A45F 3/04 224/633 |
| 2015/0320150 A1 | 11/2015 | Beck | |
| 2015/0320182 A1 * | 11/2015 | Beck | A44B 13/0029 24/644 |
| 2016/0106199 A1 * | 4/2016 | Hairston | A45F 3/14 224/633 |
| 2016/0255942 A1 | 9/2016 | Wagner et al. | |
| 2016/0260942 A1 | 9/2016 | Wagner et al. | |
| 2016/0345714 A1 | 12/2016 | Yamaoka et al. | |
| 2017/0102735 A1 | 4/2017 | Blowers et al. | |
| 2018/0008031 A1 | 1/2018 | Johnsson et al. | |
| 2018/0042365 A1 | 2/2018 | Riehmann et al. | |
| 2018/0303227 A1 | 10/2018 | Simione | |
| 2019/0074489 A1 * | 3/2019 | Yamaoka | A45F 3/04 |
| 2019/0110650 A1 | 4/2019 | Mobarak et al. | |
| 2019/0125062 A1 | 5/2019 | Kippen | |
| 2019/0313775 A1 | 10/2019 | Tamagnini | |
| 2020/0085173 A1 | 3/2020 | Nordmann et al. | |
| 2020/0323312 A1 * | 10/2020 | Lennings | A45F 3/04 |
| 2020/0343605 A1 * | 10/2020 | Kawano | H01M 10/6235 |

FOREIGN PATENT DOCUMENTS

| | | |
|---|---|---|
| DE | 10 2015 002 724 A1 | 9/2016 |
| EP | 2 819 207 A1 | 12/2014 |
| EP | 3 106 565 A2 | 12/2016 |
| ER | 0 887 005 A1 | 12/1998 |
| WO | WO 2009/157881 A1 | 12/2009 |
| WO | WO 2018/007111 A1 | 1/2018 |

OTHER PUBLICATIONS

English translation of document B2 (DE 20 2012 013 284 U1 previously filed on Sep. 16, 2019) (48 pages).
English translation of document B3 (DE 20 2013 011 447 U1 previously filed on Sep. 16, 2019) (20 pages).
English translation of document B4 (EP 2 819 207 A1 previously filed on Sep. 16, 2019) (14 pages).

* cited by examiner

HARNESS

CROSS REFERENCE TO RELATED APPLICATION

This application contains subject matter related to U.S. Application Ser. No. 16/571,793, entitled "Harness" filed on Sep. 16, 2019.

BACKGROUND AND SUMMARY OF THE INVENTION

The invention relates to a harness with a support base and a support strap unit for the support base. The support base serves to receive an object that is to be carried, e.g. by securing the object on the support base or by introducing the object into a receiving space of the support base. The support strap unit serves to allow a user to wear the support base, with the object located on or in the latter, on his back.

The harness can be designed in particular to carry a battery pack, in particular a battery pack that can be worn on the back and that supplies electrical energy to hand-held electrical tools, in particular electrically powered gardening and/or forestry tools. In the present case, hand-held electrical tools are to be understood especially as electrical tools that are carried by hand or guided along the ground, in particular those used for gardening and/or forestry work, such as power saws, hedge shears, leaf blowers, sweepers, lawnmowers and scarifiers, to give just a few examples. The battery pack is designed to be worn on the user's back by means of the harness system and supplies the electrical energy that the electrical tool requires during use, for which purpose it has suitable storage battery cells, which are to be understood here as any desired conventional accumulator or battery cells. Typically, the storage battery cells are arranged to form an accumulator cell block.

When used for carrying a battery pack, the harness has a holding device for releasably holding the battery pack in a support position on the support base. Various securing or holding mechanisms are known for the holding device. In one of these known types, the battery pack is placed in a translational approach movement onto the support base, which can be formed for example by a plate-like support structure, and is then brought into the support position in a displacement movement perpendicular to the approach movement, e.g. from the top downwards. In this context, see for example the laid-open publications US 2016/0345714 A1 and WO 2018/007111 A1, and also the utility model publications DE 20 2012 013 284 U1 and DE 20 2013 011 447 U1. Unless stated otherwise, reference is made here in respect of the location orientation to the orientation of the harness when it is located on a user's back or to the orientation of the battery pack in its support position in the harness located on a user's back. In the alternative type considered here, the holding device has a docking mechanism on the support base for pivotably docking the battery pack in a docking position, and a securing mechanism on the support base for securing the battery pack in the support position pivoted in towards the support base with respect to the docking position.

The laid-open publication EP 2 819 207 A1 discloses a holding device of this kind, wherein the docking mechanism is formed there by an upper edge of the support base over which a hook-shaped configuration of an upper edge of the battery pack can be engaged in such a way that a certain pivotability of the battery pack relative to the support base is maintained, with the upper edge of the support base as pivot axis. The function of the securing mechanism is provided by two locking projections which are arranged laterally on the support base, in the lower region thereof, and which interact with corresponding mating locking projections in the lower lateral region of the battery pack so as to form a releasable snap-fit connection, wherein a handle is arranged on the underside of this battery pack, i.e. on it lower side in the support position on a user's back.

The support strap unit of the harness in most cases comprises a shoulder strap unit as a supporting aid for the user. For corresponding uses, it is also expedient if the support strap unit has a waist strap unit. In a typical harness of this kind, the support strap unit additionally has a joint unit, which connects the waist strap unit to the support base in an articulated manner. In the aforementioned utility model specification DE 20 2013 011 447 U1, the joint unit consists of a joint via which a cross-piece is coupled pivotably to the support base about a substantially horizontal pivot axis perpendicular to a plane of the plate-shaped support base, wherein the cross-piece serves to secure a waist strap. In a harness disclosed in the laid-open specification DE 10 2015 002 724 A1, the joint unit consists of a joint which is preferably formed by a fabric/film hinge and by which the waist strap unit is connected pivotably to the support base about a substantially horizontal pivot axis parallel to a plane of the plate-shaped support base. This is intended to facilitate the inward folding of the waist strap unit when setting the harness down and in this way to prevent the waist strap unit from forming an obstacle to the harness being set down in an upright position.

The harness may comprise a support base and a support strap unit for the support base, wherein the support strap unit has at least one shoulder strap unit which is releasably connectable to the support base. Such harnesses are in most cases embodied in such a way that the shoulder strap unit can be adjusted to modify the height of the support base. Conventionally in most cases, this is achieved by the fact that a strap web, which can be adjusted in length, is used for a respective shoulder strap of the shoulder strap unit.

It is an object of the invention to provide a harness of the type mentioned at the outset, which is improved in relation to the abovementioned harnesses of the prior art, in particular as regards the way in which a battery pack or other object is secured on the support base and/or as regards the articulated connection of the waist strap unit to the support base and/or as regards the adjustability of the shoulder strap unit.

The invention achieves this and other objects by providing a harness having characteristic inventive features. Advantageous developments of the invention are set forth in the dependent claims, the wording of which is herewith incorporated by reference in the description.

According to one aspect of the invention, the harness is designed to allow a user to carry on his back an object such as e.g. a battery pack for supplying electrical energy to hand-held electrical tools, which in particular can be electrically powered gardening and/or forestry tools, where the harness comprises for this purpose a support base, a support strap unit for the support base, and a holding device for releasably holding the object in a support position on the support base, wherein the holding device comprises a docking mechanism on the support base for pivotably docking the object in a docking position, and a securing mechanism on the support base for securing the object in the support position pivoted in towards the support base with respect to the docking position. The docking mechanism is characteristically arranged on a lower region of the support base.

By virtue of these features of the harness, the object can be coupled in a very advantageous manner to the harness. For this purpose, it is docked onto the lower region of the support base, using the docking mechanism, and can then be pivoted in towards the support base in order to reach the support position. If the top of the object is provided with a handle, it can be held by the handle while being docked onto the lower region of the support base and then being pivoted in towards the support base as far as the support position.

The handling of the object, when placing it onto and removing it from the harness, can in this way be restricted to the upper region of the object and of the harness; the user does not necessarily have to manoeuvre the lower region of the object and of the harness. This generally makes handling easier for the user when he wishes to place the object on the harness when the latter is positioned on the ground or on a rest surface. Moreover, after the docking of the object, that side of the support base on which the object is to be placed still remains clearly visible to the user, which makes it easier for him to pivot it into the support position. The docking of the object at the lower region of the support base is also advantageous for reasons of stability, since the tilting moment associated with the docking of the object can be kept low for the harness, in particular much lower than in the case where the object is docked on a central or even an upper region of the support base.

In a development of the invention, the docking mechanism provides a pivot axis substantially parallel to an underside of the support base and serving for the pivoting movement of the object to the support position. This contributes further to optimizing the handling of the object when placing it on or removing it from the harness.

In a development of the invention, the securing mechanism has a securing slide which is arranged displaceably on the support base between a release position and a securing position and has a securing hook, which is designed to engage securely behind a corresponding mating securing element of the battery pack in the support position. This constitutes a structurally simple and functionally advantageous embodiment of the securing mechanism.

In an alternative development of the invention, the securing mechanism has a securing lever which is arranged pivotably on the support base between a release position and a securing position and has a securing bow, which is designed to engage securely behind a corresponding mating securing element of the object in the support position. This too constitutes a structurally simple and functionally reliable configuration of the securing mechanism, and one that is expedient from the point of view of handling.

In one embodiment of the invention, with the object not docked, the securing slide is located in the securing position, wherein it has a run-on bevel which is designed, by interaction with the mating securing element of the object, to displace the securing slide automatically in the direction of the release position when the object docked on the support base is pivoted inwards in the direction of the support position. By this measure, the securing slide can be moved automatically out of the securing position, by the inward pivoting of the object to its support position, without having to be actuated separately by the user for this purpose. In this case, the securing slide can preferably be pretensioned in the direction of the securing position by a corresponding elastic pretensioning element. During the inward pivoting of the battery pack to its support position, the securing slide is then displaced, counter to the action of the pretensioning element, to the release position, and, as soon as the object has reached its support position, the pretensioning element can automatically return the securing slide to its securing position.

In one embodiment of the invention, the securing bow has a run-on face extending in an arc shape with a non-constant spacing from a pivot axis of the securing lever, against which run-on face the mating securing element can be placed with a spacing from the pivot axis that decreases with increasing pivoting of the securing lever in the direction of the securing position. This makes it easier to safely pivot the object into its support location on the support base. In particular, these special kinematics of the securing lever permit an optimal force profile of the inward pivoting force or securing force exerted on the object.

In one embodiment of the invention, the securing slide or the securing lever has a user-actuated control element which is located on a side of the support base directed away from an object coupling side of the support base. This facilitates handling by the user when bringing the object from its docking position to its support position. The user can for this purpose control the securing slide or securing lever from that side of the support base that is directed away from the side of the support base for coupling the object. This control actuation is therefore not impeded by the docked object.

In a development of the invention, the holding device has a cushioning spring arrangement which provides the object, in the support position thereof, with elastic cushioning with a resilience acting in the outward pivoting direction. This contributes to safely holding the object free of play in its support position on the support base. Since the resilience of the cushioning spring arrangement acts on the object in the outward pivoting direction away from the support base, the cushioning spring arrangement can avoid undesired sudden impacts of the object against rigid parts of the support base. A barrier to outward pivoting expediently serves to block an outward pivoting of the object as a result of the resilience of the cushioning spring arrangement. This barrier to outward pivoting can be released when the user wishes to detach the object from the support base and for this purpose to pivot it initially from its support position to its docking position. The securing slide or the securing lever preferably functions as such a barrier to outward pivoting, or a separate barrier to outward pivoting can alternatively be provided.

In a further aspect of the invention, which can be provided alternatively or additionally to the aspect of the invention mentioned above, the harness comprises a support base and a support strap unit for the support base, wherein the support strap unit has a shoulder strap unit, a waist strap unit and a joint unit which connects the waist strap unit to the support base in an articulated manner. The joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base.

This constitutes a very advantageous embodiment for articulating the waist strap unit on the support base so as to be pivotable about two axes, without this requiring two individual joint units, and without two such joints being able to interfere with each other. By means of this double joint, the waist strap unit can be pivoted, in each case to the desired extent relative to the support base, about the pivot axis substantially parallel to the plate plane of the support base and also about the pivot axis substantially perpendicular with respect to the plate plane of the support base. Both pivoting mobilities are of advantage for providing corresponding deflection movements of the waist strap unit relative to the support base.

In a development of the invention, the joint unit, and thus also the double joint, is formed by an autonomous component which is fastened on the one hand to the waist strap unit and on the other hand to the support base. Such a joint unit can be produced with a high load-bearing capacity and a long useful life and does not limit the choice of material for the waist strap unit and the support base.

In a development of the invention, one pivot axis runs substantially between and parallel to two mutually facing side edges of the waist strap unit on the one hand and of the support base on the other hand, and the other pivot axis runs, offset with respect to this pivot axis, in the direction away from the waist strap unit. This results in advantageous kinematics for the pivotability of the waist strap unit relative to the support base.

According to a further aspect of the invention, which can be provided additionally or alternatively to each of the aspects of the invention mentioned above, the harness comprises a support base and a support strap unit for the support base, wherein the support strap unit has at least one shoulder strap unit, which is releasably connectable to the support base. Characteristically, the shoulder strap unit according to this aspect of the invention comprises at least one flexurally stiff strap holder which, by means of a latch mechanism, can be releasably locked at several different heights on the support base, and at least one flexible strap web connected to the strap holder. The flexurally stiff design of the strap holder allows the shoulder strap unit to be bound to the support base in a very stable position. The possibility of being able to releasably lock the strap holder at several different heights on the support base makes available an advantageous height adjustability for the shoulder strap unit. Designing the strap web to be flexible and not flexurally stiff, in contrast to the strap holder, allows comfortable wear of the harness by the user in the conventional manner.

In one embodiment of the invention, the latch mechanism provides several latches for the at least one strap holder at the different heights on the support base, wherein the respective latch comprises a latch release position and, upwardly offset in relation to the latch release position, a latch holding position, between which positions the strap holder is vertically displaceable on the support base. In the latch release position, the strap holder can be attached at the desired height to the support base or removed therefrom. In the latch holding position, the strap holder is connected to the support base in a locked manner, such that it cannot come loose from the support base. To release the strap holder from the support base, the strap holder has to be moved downwards to the latch release position. The upwardly offset arrangement of the latch holding position in relation to the latch release position has the advantage that a weight which acts on the support base in a downward direction cannot cause an inadvertent movement of the strap holder to the latch release position. Instead, this weight of the support base has the effect that the strap holder remains safely in the latch holding position.

In one embodiment of the invention, the latch mechanism has a releasable snap-in lock, which holds the strap holder locked in the respective latch holding position. It is only after this snap-in lock has been released by the user that the strap holder on the support base can be moved downwards to the latch release position and then detached from the support base or placed again at a different height thereon.

This constitutes an additional safeguard for the height-adjustable mounting of the support holder on the support base.

In a further aspect, the invention makes available a tool kit which comprises a harness according to the invention and a battery pack that can be worn on the back, can be secured to the harness and supplies electrical energy to hand-held electrical tools, in particular electrically powered gardening and/or forestry tools. The battery pack can in particular be of the kind disclosed in the Applicant's European patent application no. 18194901.7 (having U.S. counterpart application Ser. No. 16/571,994, entitled "Rechargeable Battery Pack", and filed on even date herewith), the entire content of which is expressly incorporated by reference herein.

In one embodiment of the invention, the tool kit additionally comprises a hand-held electrical tool that can be supplied with electrical energy from the battery pack.

Advantageous embodiments of the invention are shown in the drawings. These and further advantageous embodiments of the invention are set out and described in more detail below.

DETAILED DESCRIPTION OF THE DRAWINGS

Figure 1:
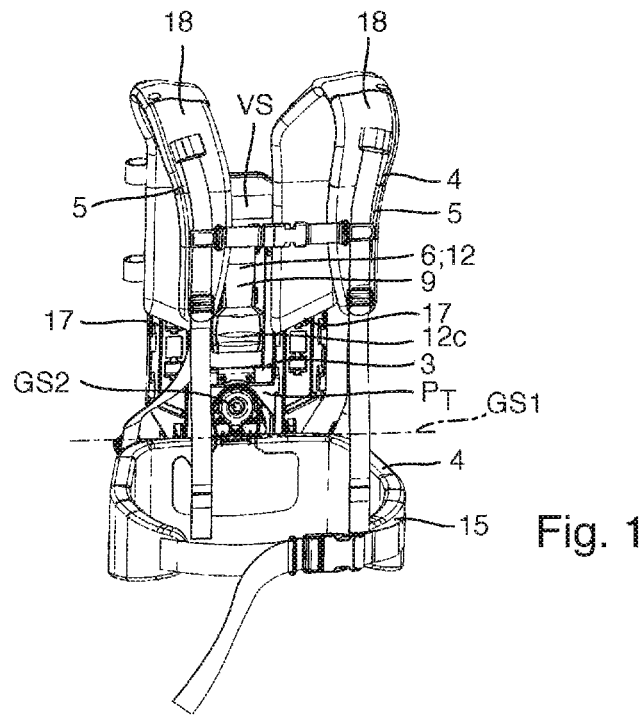
FIG. 1 shows a perspective front view of a harness.
Figure 2:
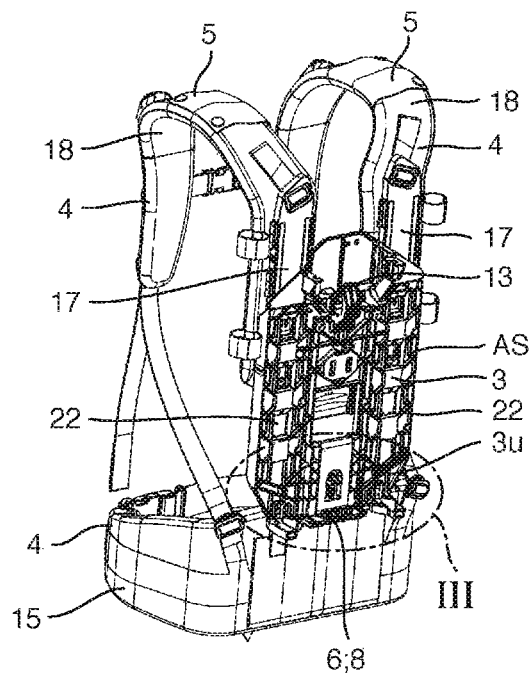
FIG. 2 shows a perspective rear view of the harness.
Figure 3:
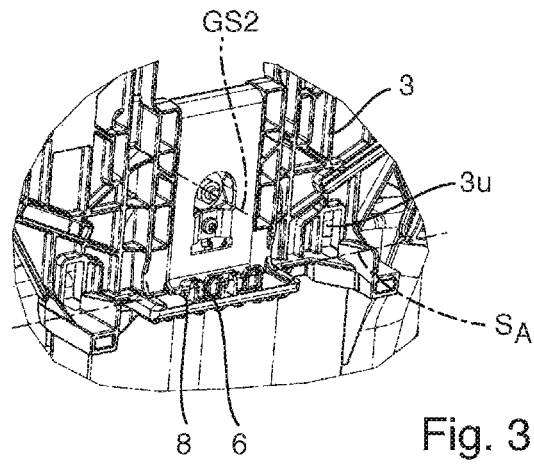
FIG. 3 shows a detail of a region III in FIG. 2.
Figure 4:
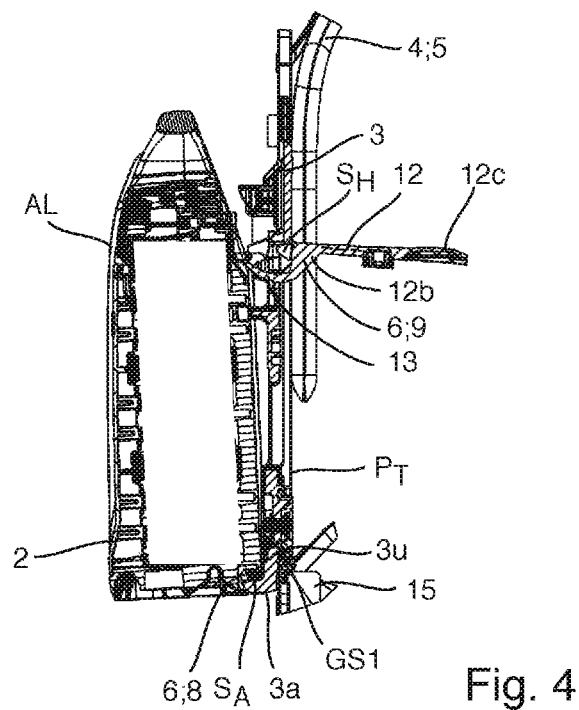
FIG. 4 shows a longitudinal sectional view of a harness with securing lever, and of a battery pack coupled in the docking position.

A harness illustrated in various views and embodiments in FIGS. 1 to 15 can be used on the back of a user in order to carry any desired objects that can be worn on the back. For this purpose, the harness has a support base 3 which serves to receive the object to be carried, e.g. by securing the object on the support base 3, or by introducing the object into a receiving space of the support base 3 in the same way as with a conventional backpack. In advantageous embodiments, the support base 3 has a plate-shaped structure, as shown.

Alternatively, it can have any other desired structure of the kind known per se to a person skilled in the art for this functional component of harnesses of the type in question here, which does not require any further explanation here. Moreover, the harness comprises a support strap unit 4 for the support base 3. With the support strap unit 4, the user can wear the support base 3 on his back, with the object located on or in it.

In corresponding embodiments, the harness is designed as shown for carrying a battery pack 2, which in particular can be a battery pack that can be worn on the back and that supplies electrical energy to hand-held electrical tools, such as electrically powered gardening and/or forestry tools. For this purpose, the harness in such embodiments has a holding device 6 for releasably holding the battery pack 2 in a support position 7 on the support base 3.

Figure 5:
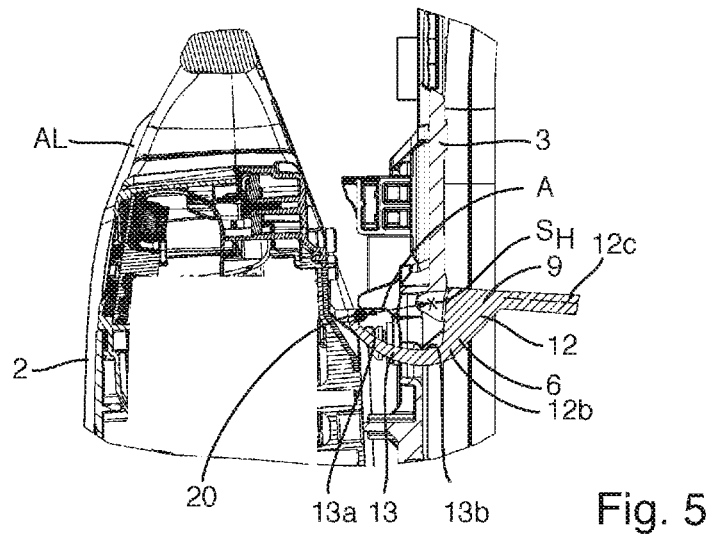
FIG. 5 shows a detail of an upper part of FIG. 4.
Figure 6:
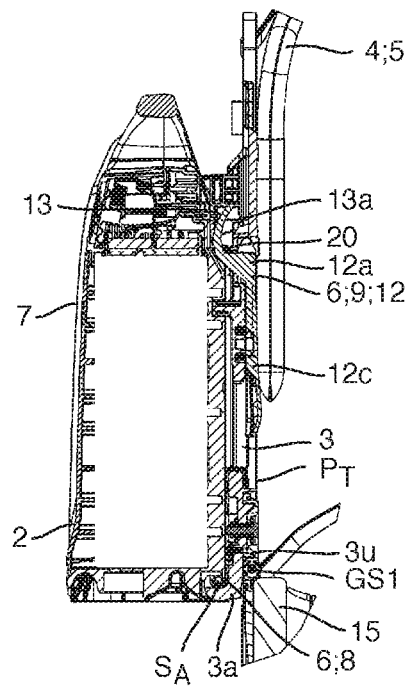
FIG. 6 shows the view from FIG. 4 with the battery pack in the support position.
Figure 7:
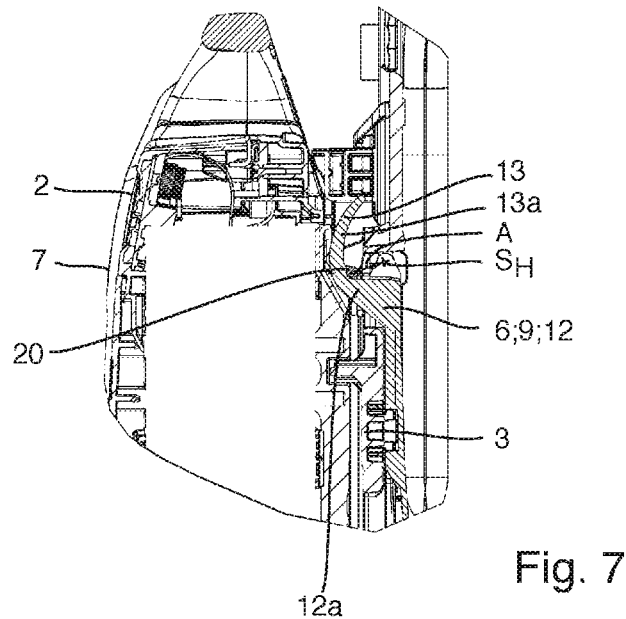
FIG. 7 shows the view from FIG. 5 with the battery pack in the support position.
Figure 8:
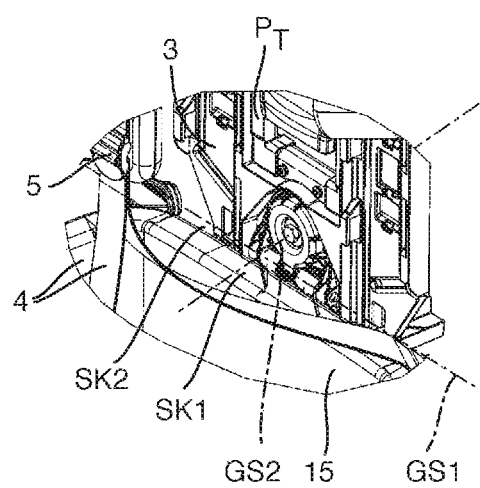
FIG. 8 shows a perspective detail of a connection region of a waist strap unit and of a shoulder strap unit of a harness.
Figure 9:
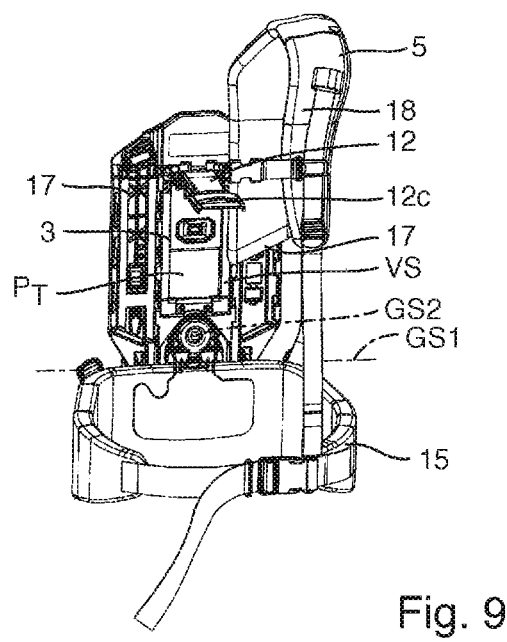
FIG. 9 shows a view corresponding to FIG. 1, with a strap web omitted.
Figure 10:
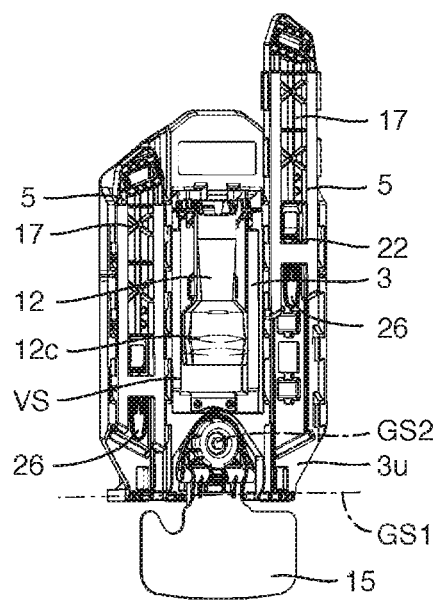
FIG. 10 shows a view corresponding to FIG. 9 with a strap web omitted and a waist strap unit partially omitted.
Figure 11:
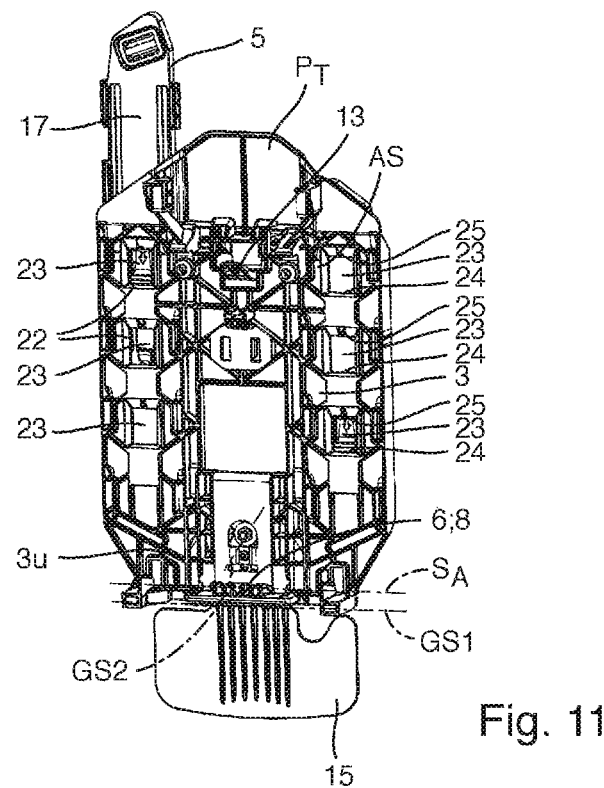
FIG. 11 shows the rear view of the harness from FIG. 10.
Figure 12:
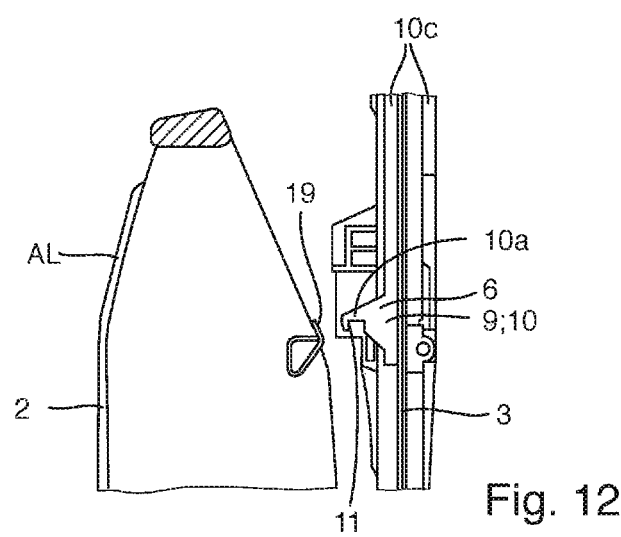
FIG. 12 shows a view corresponding to FIG. 5 for a harness with securing slide.
Figure 13:
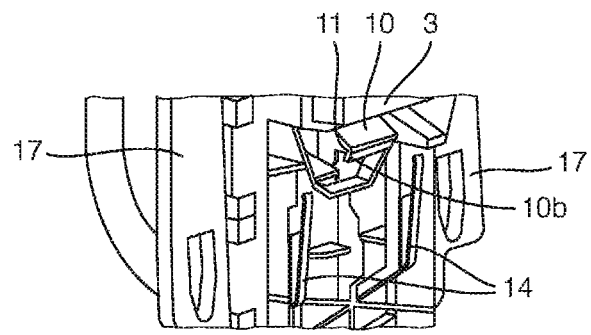
FIG. 13 shows a perspective rear view of a region of the harness from FIG. 12 comprising the securing slide.
Figure 14:
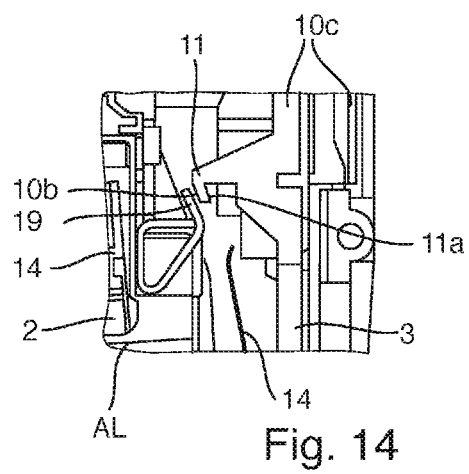
FIG. 14 shows a schematic sectional view of the region from FIG. 13 with the battery pack of FIG. 12 in the docking position.
Figure 15:
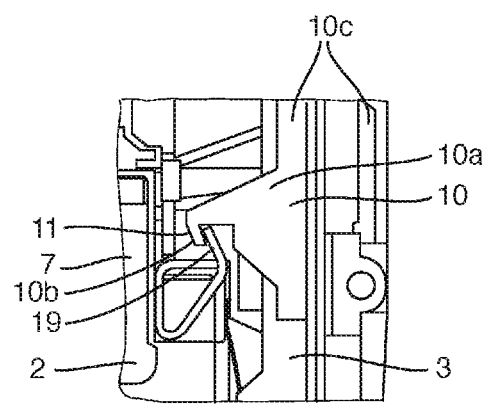
FIG. 15 shows the view from FIG. 14 with the battery pack in the support position.

The holding device 6 comprises a docking mechanism 8 on the support base 3 for pivotably docking the battery pack 2 in a docking position AL, as is shown for example in FIGS. 4, 5, 12 and 14, and a securing mechanism 9 on the support base 3 for securing the battery pack 2 in the support position 7 pivoted in towards the support base 3 with respect to the docking position AL, as is shown for example in FIGS. 6, 7 and 15. The docking mechanism 8 is arranged on a lower region 3u of the support base 3.

In corresponding embodiments, the docking mechanism 8 provides a pivot axis $S_A$ substantially parallel to an underside 3a of the support base 3 and serving for the pivoting movement of the battery pack 2 into the support position 7, as can be seen for example in FIGS. 3, 4, 6 and 11. In advantageous embodiments, this pivot axis $S_A$ is located directly on the underside 3a of the support base or at only a relatively short vertical distance above the latter.

In a corresponding embodiment, the securing mechanism 9 comprises a securing slide 10 which is arranged displaceably on the support base 3 between a release position and a securing position 10a and has a securing hook 11, which is designed to engage securely behind a corresponding mating securing element 19 of the battery pack 2 in the support position 7. Such an embodiment is illustrated in FIGS. 12 to 15. The release position, which is not explicitly shown, is located vertically above the indicated securing position 10a.

In corresponding embodiments, when the battery pack 2 is not docked, the securing slide 10 is located in the securing position 10a, and the securing slide 10 has a run-on bevel 10b which is designed, by interaction with the mating securing element 19 of the battery pack 2, to displace the securing slide 10 automatically in the direction of the release position during the inward pivoting of the docked battery pack 2 in the direction of the support position 7. Optionally, an elastic pretensioning element (not shown) is arranged on the support base 3 and pretensions the securing slide in the direction of its securing position 10a. During the inward pivoting of the battery pack 2 to its support position 7, the securing slide 10 is then displaced, counter to the action of the pretensioning element, from its securing position 10a to its release position, such that the battery pack 2 can be pivoted in fully to its support position 7, after which the pretensioning element automatically returns the securing slide 10 to its securing position 10a.

In corresponding embodiments, the securing hook 11 is configured, as in the example of FIGS. 12 to 15, extending obliquely with an inner face 11a, such that, in the manner of a safety catch, it safely holds the mating securing element 19 of the battery pack 2 against forces acting in the outward pivoting direction. In other words, this oblique catch inner face 11a of the securing hook 11 counteracts an inadvertent sliding of the battery pack 2 out of its support position 7.

In an alternative embodiment of the securing mechanism 9, the latter has a securing lever 12 which is arranged pivotably on the support base 3 between a release position 12b and a securing position 12a and has a securing bow 13, which is designed to engage securely behind a corresponding mating securing element 20 of the battery pack in the support position 7. Such an embodiment of the securing mechanism 9 can be seen in FIGS. 1, 2, 4 to 7 and 9 to 11.

In corresponding embodiments, the securing bow 13 has, as shown, a run-on face 13a extending in an arc shape with a non-constant spacing from a pivot axis $S_H$ of the securing lever. The mating securing element 20 of the battery pack 2 bears against the run-on face 13a of the securing bow 13 with a spacing A from the pivot axis $S_H$ of the securing lever 12, wherein this spacing A decreases with increasing pivoting of the securing lever 12 in the direction of the securing position 12a. This spacing A is thus minimal in the support position 7 of the battery pack 2 or in the securing position 12a of the securing lever 12, as shown in FIG. 7, whereas it is considerably greater by contrast in the docking position AL of the battery pack 2, in which position the battery pack 2 is located when its mating securing element 20 reaches the region of the securing lever 12 or of the securing bow 13 thereof, as shown in FIG. 5. This represents an advantageous force profile characteristic for the force exerted on the battery pack 2 by the securing lever 12 during the inward pivoting from the docking position AL to the support position 7.

Optionally, as is shown, the securing lever 12 can be provided, at its securing-side end of the run-on face 13a, with a latching shoulder 13b or the like in order to additionally secure the battery pack 2 in the support position 7 against inadvertent outward pivoting.

In corresponding embodiments, the securing slide 10 or the securing lever 12 has a user-actuated control element 10c, 12c which is located on a side VS of the support base 3 directed away from a battery pack coupling side AS of the support base 3. The coupling side AS can in particular be a rear face of the support base 3 directed away from the back of the user, wherein the side VS of the support base 3 directed away from the coupling side AS is then a front face of the support base 3 directed towards the back of a user when wearing the harness. In this case, the securing slide 10 or the securing lever 12 can be moved by the user from the securing position 10a, 12a to the release position 12b via the control element 10c, 12c on the front face RS of the support base 3, in order to permit an outward pivoting of the battery pack 2 from its support position 7 to its docking position AL and then to permit removal of the battery pack 2 from the support base 3. In alternative embodiments, the securing slide 10 or the securing lever 12 can be moved by the user in some other way from the securing position 10a, 12a to the release position 12b.

In corresponding embodiments, the holding device 6 has a cushioning spring arrangement 14 which provides the battery pack 2, in the support position 7 thereof, with elastic cushioning having a resilience acting in the outward pivoting direction. By virtue of this cushioning spring arrangement 14, the battery pack 2 can therefore bear resiliently against the support base 3 when it is located in its support position 7, such that the cushioning spring arrangement 14 can absorb or reduce impacts from the battery pack 2 on the support base 3, and vice versa. Moreover, the cushioning spring arrangement 14 is suitable for holding the battery pack 2 free of play in its support position 7 on the support base 3. The cushioning spring arrangement 14 can, for example, comprise an arrangement of one or more leaf springs arranged on the support base 3, as can be seen in FIGS. 12 to 15. In alternative embodiments, the cushioning spring arrangement can, additionally or alternatively to leaf springs, comprise an arrangement of one or more rubber buffers arranged on the support base, in particular round rubber buffers.

In corresponding embodiments, the harness comprises the support base 3 and the support strap unit 4 in a configuration in which the support strap unit 4 has a shoulder strap unit 5, a waist strap unit 15 and a joint unit which connects the waist strap unit 15 to the support base 3 in an articulated manner. The joint unit comprises a double joint 16 by which the waist strap unit 15 is connected to the support base 3 so as to be pivotable about two pivot axes GS1, GS2, as can be seen in particular from FIGS. 1 and 8 to 10. The pivot axis GS1 runs substantially parallel to a plate plane $P_T$ of the support base 3, while the other pivot axis GS2 runs substantially perpendicularly with respect to this plate plane $P_T$ of the support base 3. By means of this double joint 16, the waist strap unit 15 can thus be pivoted, in each case to the desired extent, about the preferably horizontal pivot axis GS1 in the direction of the front face RS or rear face AS of the support base 3 and also about the likewise preferably horizontal pivot axis GS2 laterally with respect to the support base 3. Preferably, the joint unit or the double joint 16 is formed by an independent component which is secured on the one hand to the waist strap unit 15 and on the other hand to the support base 3, as in the illustrative embodiment shown.

In advantageous embodiments, the pivot axis GS1 runs substantially between and parallel to two mutually facing side edges SK1, SK2 of the waist strap unit 15 on the one hand and of the support base 3 on the other hand, as can be seen in particular from FIGS. 8 to 11, and the pivot axis GS2 runs, offset with respect to this pivot axis GS1, in the direction away from the waist strap unit 15, specifically offset in an upward direction in the illustrative embodiment shown. This results in the waist strap unit 15 having kinematics of motion with respect to the support base 3 that are optimal for corresponding uses. In corresponding embodiments, the support base 3 forms a rigid or flexurally stiff component, or it can alternatively be realized as a flexurally soft component.

In corresponding embodiments, the harness comprises the support base 3 and the support strap unit 4 in a configuration in which the support strap unit has at least one shoulder strap unit 5, which is releasably connectable to the support base 3. In these embodiments, the shoulder strap unit 5 comprises at least one flexurally stiff strap holder 17 which, by means of a latch mechanism 22, can be releasably locked at several different heights on the support base 3, and at least one flexible strap web 18 connectable to the strap holder 17. In this case, the strap holder 17 consequently constitutes a stiff, rigid structural part in relation to the flexible strap web 18. The illustrative embodiments shown comprise this type of shoulder strap unit 5, as can be seen from the corresponding figures. In corresponding configurations, the shoulder strap unit 5 has only one flexurally stiff strap holder on which, for example, two flexible strap webs to be worn by the user can be arranged, or the shoulder strap unit 5 comprises, as shown, two flexurally stiff strap holders 17, to each of which a flexible strap web 18 or a common strap web can be connected.

In advantageous embodiments, the latch mechanism 22 provides several latches 23 for the at least one strap holder 17 at different heights on the support base 3. The respective latch 23 comprises a latch release position 24 and, upwardly offset in relation to the latch release position, a latch holding position 25. The strap holder 17 is vertically displaceable on the support base 3 between the latch release position 24 and the latch holding position 25 of the selected latch 23. In the latch release position 24, the strap holder 17 can be attached at the desired height to the support base 3 or removed therefrom. In the latch holding position 25, the strap holder 17 is connected to the support base 3 in a locked manner and is thus secured against coming loose from the support base 3. The strap holder 17 can be released from the support base 3 only if it is first moved downwards from the latch holding position 25 to the latch release position 24. This has the advantage that the weight of the support base 3, which acts in a downward direction and therefore seeks to move the support base 3 downwards relative to the strap holder 17 held by the user over the rest of the shoulder strap unit 5, cannot cause inadvertent release of the strap holder 17 from the support base 3. Instead, the strap holder 17 is held securely in its latch holding position 25 by the weight of the support base 3, which also includes the weight of an object held on or received by the latter.

In advantageous embodiments, the latch mechanism 22 has a snap-in lock 26, which holds the at least one strap holder 17 locked in the respective latch holding position 25. In the configuration shown, the snap-in lock 26 is formed by a locking button which can be actuated by the user to unlock it. When the user wishes to release the locking of the strap holder 17 in its latch holding position 25 in order to bring the strap holder 17 from its latch holding position 25 to its latch release position 24, he presses the locking button.

Figure 16:
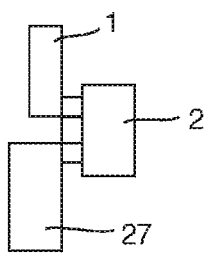
FIG. 16 shows a schematic block diagram of a tool kit with a harness, a battery pack and an electrical tool powered by the latter.

FIG. 16 is a block diagram illustrating a tool kit with a harness 1 and with a battery pack 2 that can be worn on the back and can be secured to the harness. Optionally, the tool kit additionally comprises a hand-held electrical tool 27 that can be supplied with electrical energy from the battery pack 2, for example an electrically powered gardening and/or forestry tool. The battery pack 2 can be mounted releasably on the harness 1 in the manner indicated. The electrical tool 27 can be coupled electrically to the battery pack 2 and/or the harness 1 by means of a flexible electrical lead or alternatively by a direct plug connection. Moreover, depending on the system configuration, the electrical tool 27 can be coupled mechanically rigidly to the battery pack 2 and/or the harness 1.

As is clear from the illustrative embodiments shown in the figures and discussed above, the invention makes available a harness with advantageous functional features as regards strap height adjustment, binding of the waist strap unit to the support base and/or coupling of a battery pack that can be worn on the back. Although the harness is suitable in particular for carrying a battery pack, it is also suitable, depending on the embodiment, alternatively or additionally for carrying other objects that are mounted on the support base or that are received, for example, in a container or bag of the support base.

What is claimed is:

1. A harness for an object configured to be worn on the back, the harness comprising:
   a support base;
   a support strap unit for the support base; and
   a holding device for releasably holding the object in a support position on the support base,
   wherein
   the holding device comprises a docking mechanism on the support base for pivotably docking the object in a docking position, and a securing mechanism on the support base for securing the object in the support position pivoted in towards the support base with respect to the docking position, the docking mechanism is arranged on a lower region of the support base, the securing mechanism comprises a securing slide which is arranged displaceably on the support base between a release position and a securing position and comprises a securing hook, which is designed to engage securely behind a corresponding mating securing element of the object in the support position, or the securing mechanism comprises a securing lever which is arranged pivotably on the support base between a release position and a securing position and comprises a securing bow, which is designed to engage securely behind a corresponding mating securing element of the object in the support position, the securing slide or the securing lever comprises a user-actuated control element which is located on a side of the support base directed away from an object coupling side of the support base.

2. The harness according to claim 1, wherein the docking mechanism comprises a pivot axis, substantially parallel to an underside of the support base, for the pivoting movement of the object into the support position.

3. The harness according to claim 1, wherein, when the object is not docked, the securing slide is located in the securing position, and the securing slide comprises a run-on bevel which is designed, by interaction with the mating securing element, to displace the securing slide automatically in the direction of the release position when the docked object is pivoted inwards in the direction of the support position.

4. The harness according to claim 1, wherein the securing bow comprises a run-on face extending in an arc shape with a non-constant spacing from a pivot axis of the securing lever, against which run-on face the mating securing element can be placed with a spacing from the pivot axis, which spacing decreases with increasing pivoting of the securing lever in the direction of the securing position.

5. The harness according to claim 1, wherein the holding device comprises a cushioning spring arrangement which provides the object, in the support position, with elastic cushioning with a resilience acting in the outward pivoting direction.

6. The harness according to claim 1, wherein the object is a battery pack configured for supplying electrical energy to hand-held electrical tools.

7. A harness, comprising:
a support base; and
a support strap unit for the support base, wherein the support strap unit comprises a shoulder strap unit, a waist strap unit and a joint unit which connects the waist strap unit to the support base in an articulated manner,
wherein
the joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base,
one pivot axis runs substantially between and parallel to two mutually facing side edges of the waist strap unit and of the support base, and the other pivot axis runs,
offset with respect to this pivot axis, in the direction away from the waist strap unit.

8. The harness according to claim 7, wherein the joint unit is formed by an autonomous component which is fastened on the one hand to the waist strap unit and on the other hand to the support base.

9. A harness, comprising:
a support base; and
a support strap unit for the support base, wherein the support strap unit comprises a shoulder strap unit, a waist strap unit and a joint unit which connects the waist strap unit to the support base in an articulated manner,
wherein
the joint unit comprises a double joint by which the waist strap unit is connected to the support base so as to be pivotable about two pivot axes, wherein one of the two pivot axes runs substantially parallel to a plate plane of the support base, and the other pivot axis runs substantially perpendicularly with respect to the plate plane of the support base,
the harness is configured for carrying an object to be worn on the back, said harness comprising a holding device for releasably holding the object in a support position on the support base, wherein the holding device comprises a docking mechanism on the support base for pivotably docking the object in a docking position, and a securing mechanism on the support base for securing the object in the support position pivoted in towards the support base with respect to the docking position, and the docketing mechanism is arranged on a lower region of the support base.

10. The harness according to claim 9, wherein the joint unit is formed by an autonomous component which is fastened on the one hand to the waist strap unit and on the other hand to the support base.

11. A harness, comprising:
a support base; and
a support strap unit for the support base, wherein the support strap unit comprises at least one shoulder strap unit, which is releasably connectable to the support base,
wherein
the shoulder strap unit comprises at least one structurally rigid strap holder which is configured, by means of a latch mechanism, to be releasably locked at several different heights on the support base, and at least one flexible strap web connected to the strap holder.

12. The harness according to claim 11, wherein the latch mechanism provides several latches for the at least one strap holder at different heights on the support base, wherein the respective latch comprises a latch release position and, upwardly offset in relation to the latch release position, a latch holding position, between which positions the strap holder is vertically displaceable on the support base.

13. The harness according to claim 11, wherein the latch mechanism comprises a releasable snap-in lock, which holds the at least one strap holder locked in the respective latch holding position.

14. The harness according to claim 11, wherein the harness is configured for carrying an object to be worn on the back, said harness comprising a holding device for releasably holding the object in a support position on the support base, wherein the holding device comprises a docking mechanism on the support base for pivotably docking the object in a docking position, and a securing mechanism on the support base for securing the object in the support position pivoted in towards the support base with respect to the docking position, and the docketing mechanism is arranged on a lower region of the support base.

15. The harness according to claim 11, wherein the support strap unit comprises a waist strap unit and a joint unit which connects the waist strap unit to the support base in an articulated manner, wherein the joint unit comprises a double joint by which the waist strap unit is connected to the support base to as to be pivotable about two pivot axes, wherein one of the two pivot axes runs substantially parallel to a plate plane of the support base, and the other pivot axis runs substantially perpendicularly with respect to the plate plane of the support base.

* * * * *